April 2, 1929.  J. W. RUSH  1,707,280
ANGLE COCK DEVICE
Filed Nov. 28, 1927
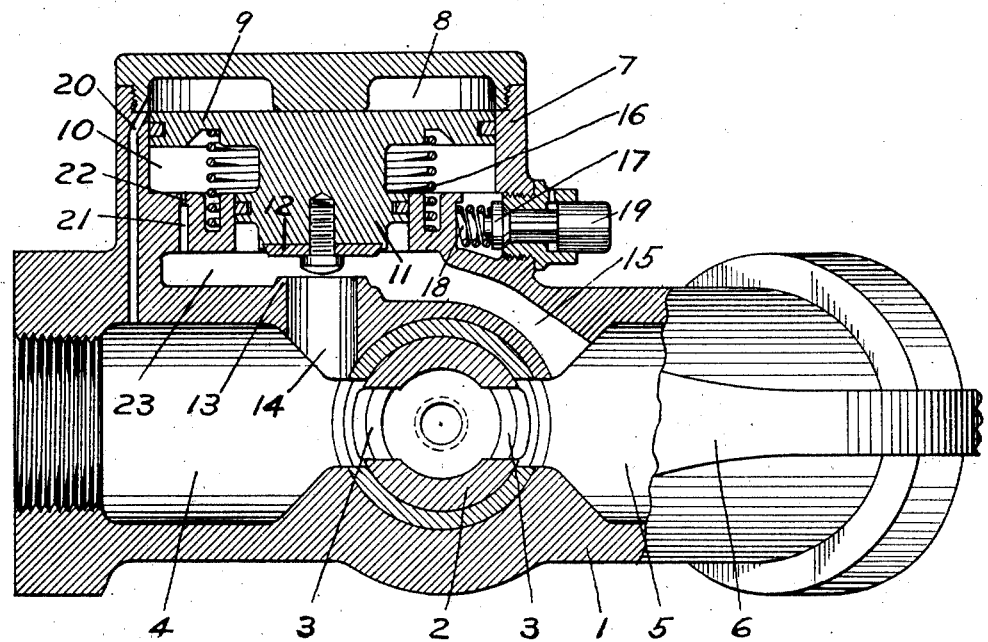
INVENTOR
JOHN W. RUSH
BY Wm. M. Cady
ATTORNEY Patented Apr. 2, 1929.

1,707,280

UNITED STATES PATENT OFFICE.

JOHN W. RUSH, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed November 28, 1927. Serial No. 236,054.

This invention relates to angle cock devices of the type employed on railway cars for controlling the opening and closing of the train brake pipe at each end of the car.

In order to avoid loss of control of the brakes due to the unintentional or malicious closing of one or more angle cocks in a train, it has heretofore been proposed to provide a valve controlled by-pass around the cock key of the angle cock device, which will afford a free communication from one side of the angle cock key to the other, even though the cock key may be in its closed position.

The principal object of my invention is to provide an improved angle cock device of the type having a by-pass around the key and in which either a service or an emergency application of the brakes may be effected through the by-pass, with the cock key in its closed position.

In the accompanying drawing, the single figure is a diagrammatic sectional view of an angle cock device embodying my invention.

As shown in the drawing, the angle cock device may comprise a body 1 in which is mounted a cock key 2 having an opening 3 adapted in the open position of the key to connect the conduit 4 at the pipe side of the angle cock with the conduit 5 at the hose side, the key 2 being provided with an operating handle 6.

The body 1 carries a hollow boss 7 having a piston chamber 8 containing a piston head 9 and a smaller piston chamber 10 containing a piston head 11 which is integral with the piston head 9. The piston head 11 carries a valve seat 12 which is adapted to engage a seat rib 13.

When the valve seat 12 is in engagement with the rib 13, communication is cut off from a passage 14, opening into the brake pipe conduit 4, to a passage 15, which opens into the hose conduit 5. A coil spring 16 acts on the piston head 9 and urges the piston heads and the valve seat 12 toward the open position.

A valve 17, normally seated by a spring 18, controls the venting of fluid under pressure from the chamber below the piston head 9 and a push button 19 is provided for operating the valve 17.

A passage 20 connects conduit 4 with piston chamber 8 and a passage 21 having a restricted portion 22 connects chamber 23 which is open to passage 15 with the space intermediate the piston heads 9 and 11.

In operation, with no fluid pressure in the angle cock device, the spring 16 will hold the piston 9 and the valve 12 in the open position, as shown in the drawing, and with the key 2 in open position, communication is established from conduit 4 through the opening 3 to conduit 5 and communication is also open from conduit 4 through passage 14 and passage 15 to conduit 5.

If a cock key 2 should be accidentally or maliciously closed, the piston 9 will be maintained in its upper position, holding the valve 12 in open position, since the fluid pressure acting on the under face of the piston 9 is maintained equal to that supplied through passage 20 to the chamber 8 at the upper side of the piston, fluid under pressure being supplied through passage 14 to the under face of piston 11 and through passage 21 to the space intermediate the piston heads 9 and 11.

The passages 14 and 15 are of sufficient area to permit of effecting a reduction in pressure in the brake pipe at an emergency rate as well as at a service rate.

If two cars are to be uncoupled and separated, the angle cocks at adjacent ends of the two cars are moved to the closed position and then the valve 17 of each angle cock is opened by pressing the push button 19, so that fluid under pressure is vented from the chamber intermediate the piston heads 9 and 11.

The fluid under pressure in the flexible hose connected to conduit 5 is also vented by way of passage 21. The fluid pressure in piston chamber 8 then exceeds the fluid pressure acting on the piston heads in the opposite direction, plus the pressure of spring 16, so that the piston heads move downwardly and cause the valve seat 12 to engage the seat rib 13. One of the push buttons 19 is then held depressed, while the usual hose couplings are uncoupled, in order to ensure that the chambers intermediate the piston heads 9 and 11 are maintained at atmospheric pressure.

After the hose couplings are disconnected, the under face of the piston 11 and the chamber intermediate the piston heads are maintained at atmospheric pressure through the flexible hose, the hose coupling of which is open to the atmosphere, so that the piston heads will hold the valve seat 12 in engagement with the seat rib 13.

At the end of the train, a dummy hose coupling may be employed to close the atmospheric opening at the hose coupling of the car, so that possible leakage from the brake pipe, past the valve seat 12, may be prevented.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device having a cock key and provided with a by-pass for establishing communication from one side of the key to the other, a valve for controlling communication through said by-pass, and a piston device having differential piston heads for operating said valve.

2. An angle cock device having a cock key and provided with a by-pass for establishing communication from one side of the key to the other, a valve for controlling communication through said by-pass, a piston device having differential piston heads for operating said valve, and a spring acting on said piston device and urging said piston device to open said valve.

3. An angle cock device having a cock key for controlling communication through a conduit and provided with a by-pass for establishing communication from the conduit at one side of the key to the conduit at the other side, a valve for controlling communication through said by-pass, a piston device having differential piston heads and subject to the opposing pressures in the conduit at opposite sides of the key, and valve means manually operable to vent fluid from the space intermediate said piston heads.

4. An angle cock device having a cock key for controlling communication through a conduit and provided with a by-pass for establishing communication from the conduit at one side of the key to the conduit at the other side, a valve for controlling communication through said by-pass, a piston device having differential piston heads and subject to the opposing pressures in the conduit at opposite sides of the key, a spring tending to move said piston device and valve to open communication through said by-pass, and valve means operable manually for venting fluid from the space intermediate said piston heads.

5. An angle cock device having a cock key for controlling communication through a conduit and provided with a by-pass for establishing communication from the conduit at one side of the key to the conduit at the other side, a valve for controlling communication through said by-pass, a piston device for operating said valve, comprising a piston head subject to the pressure of fluid in the conduit at one side of the key in a direction tending to close said valve and a piston head of smaller area than the first piston head and subject on one side to the pressure of fluid in the conduit at the opposite side of the key tending to open said valve, a restricted port through which fluid is supplied to the differential area of said piston heads, and a manually operable valve for venting fluid from the differential area.

In testimony whereof I have hereunto set my hand.

JOHN W. RUSH.